United States Patent [19]

Miller

[11] Patent Number: 5,220,785
[45] Date of Patent: Jun. 22, 1993

[54] SIDE DISCHARGE ANTI-ICE MANIFOLD
[75] Inventor: Steven M. Miller, Jupiter, Fla.
[73] Assignee: United Technologies Corporation, West Palm Beach, Fla.
[21] Appl. No.: 731,215
[22] Filed: Jul. 15, 1991
[51] Int. Cl.[5] .......................... F02G 3/00; B64D 15/00
[52] U.S. Cl. ............................. 60/39.093; 244/134 R
[58] Field of Search ................... 60/39.093; 244/53 B, 244/134 R

[56] References Cited

U.S. PATENT DOCUMENTS

| 2,474,258 | 6/1949 | Kroon | 60/39.093 |
| 3,123,283 | 3/1964 | Leis | 60/39.093 |
| 4,047,379 | 9/1977 | Brookes et al. | 60/39.093 |
| 5,029,440 | 7/1991 | Graber et al. | 60/39.093 |

FOREIGN PATENT DOCUMENTS

| 2152150 | 7/1985 | United Kingdom | 60/39.093 |
| 2224779 | 5/1990 | United Kingdom | 244/134 R |

Primary Examiner—Richard A. Bertsch
Assistant Examiner—Howard R. Richman
Attorney, Agent, or Firm—Brumbaugh, Graves, Donohue & Raymond

[57] ABSTRACT

An improved anti-ice manifold for a gas turbine engine is formed as a separate toroidal manifold arranged to be mounted forward of the inlet guide vanes. Axial discharge holes connect the manifold to interior passages in the inlet guide vanes for conveying heated gas thereto. An integral static pressure duct may also be provided in the manifold.

4 Claims, 3 Drawing Sheets

SIDE DISCHARGE ANTI-ICE MANIFOLD

SPECIFICATION

This invention was made under a U.S. Government contract and the Government has rights herein.

BACKGROUND OF THE INVENTION

This invention relates to gas turbine engines, and particularly to an improved anti-ice manifold for conducting heated gas to the inlet guide vanes of a gas turbine aircraft engine.

In a gas turbine engine inlet guide vanes are typically arranged near the engine intake between the first and second peripheral engine flanges inward of the forward engine mounting lugs. An inlet seal guide, which peripherally seals the forward end of the engine to cooperating duct seals in the engine nacelle, is typically provided forward of the inlet guide vanes. To provide anti-ice function the inlet guide vanes may have a hollow interior into which heated engine gas is ducted. Typically a manifold is provided radially outward from the inlet guide vanes in the space between the first and second peripheral engine flanges. This manifold may be formed by providing a cap which bridges the two flanges This known approach requires considerable hand welding, particularly in the region of the engine mount lugs, service and instrumentation bosses. Further, since the manifold bridges the flanges, threaded inserts must be used in the flanges, increasing required flange thickness and weight.

It is therefore an object of the present invention to provide an improved anti-ice manifold arrangement that is easily fabricated and assembled to the engine without extensive hand welding.

It is a further object of the invention to provide an improved anti-ice manifold arrangement with an integrally formed duct for conveying engine gas pressure to engine control sensors.

SUMMARY OF THE INVENTION

In accordance with the invention there is provided an improved anti-ice manifold for a gas turbine engine for conducting heated gas to inlet guide vanes. The invention comprises a hollow toroidal manifold arranged for axial mounting to the engine, forward of the inlet guide vanes. The manifold has a forward end with a tapered cross-section for being received in a forward duct seal on an engine nacelle and has rearwardly facing openings for conducting heated gas to the inlet guide vanes.

According to a preferred embodiment the manifold further includes a toroidal duct formed integrally with and isolated from the manifold and having radially inner openings for conveying engine gas pressures to the duct. The manifold is advantageously fabricated from substantially circular pieces of sheet metal which are joined with circular, automated machine welds (electron beam, TiG, or other).

For a better understanding of the present invention, together with other and further objects, reference is made to the following description, taken in conjunction with the accompanying drawings, and its scope will be pointed out in the appended claims.

DESCRIPTION OF THE PREFERRED EMBODIMENT

Figure 1:
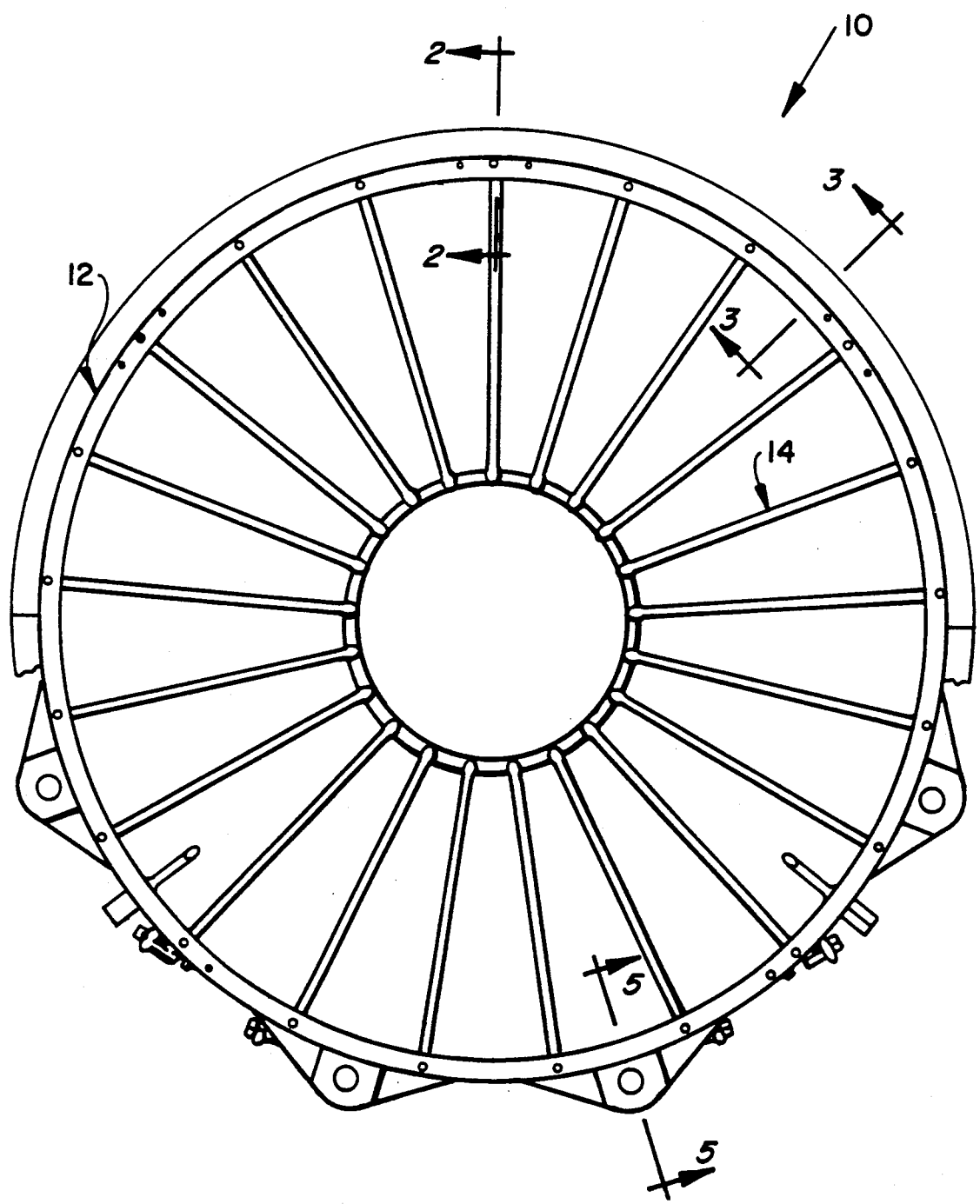
FIG. 1 is a front view of a gas turbine engine having an anti-ice manifold according to the present invention.
Figure 2:
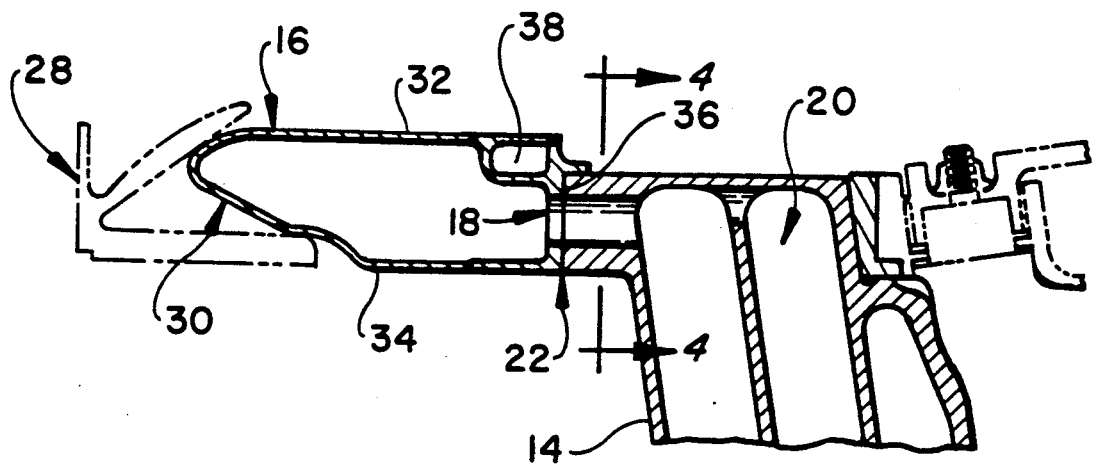
FIG. 2 is a modified cross-sectional view of the FIG. 1 engine.
Figure 3:
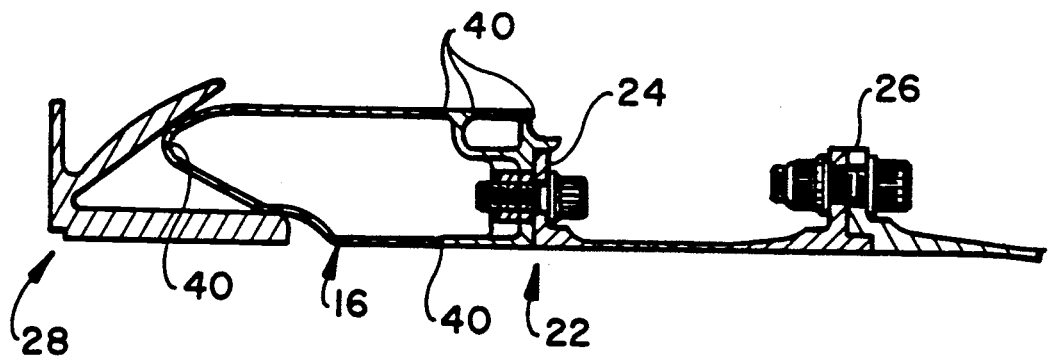
FIG. 3 is another modified cross-sectional view of the FIG. 1 engine.
Figure 5:
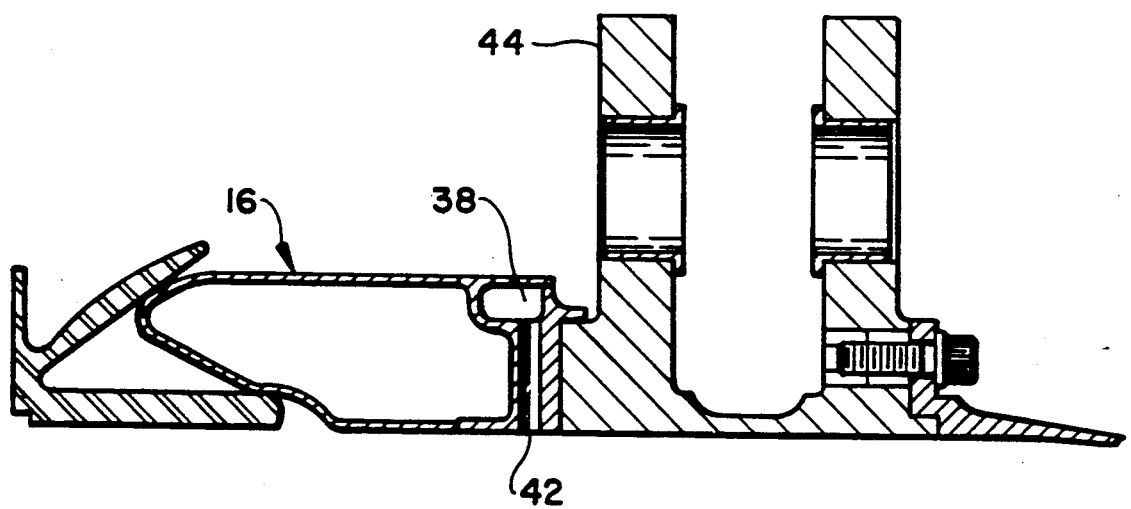
FIG. 5 is another modified cross-sectional view of the FIG. 1 engine.

FIG. 1 shows the front view of the forward, air-intake end of a gas turbine engine. The exemplary engine illustrated is an engine for a high performance military aircraft. FIGS. 2, 3 and 5 are modified cross-sectional views of the FIG. 1 engine intake section taken along corresponding lines illustrated in FIG. 1. The term modified cross-section as used herein refers to a simplified cross-sectional view illustrating only the structure immediately adjacent the cross-section, and not illustrating background structures that would normally be visible in a cross-sectional view.

The FIG. 1 engine includes a generally cylindrical peripheral housing 12 and a plurality of inlet guide vanes 14 which extend radially across the engine intake. The inlet guide vanes are typically hollow to provide internal passages 20 to which a supply of heated gas may be provided to prevent engine icing that might otherwise occur when the engine is operating at low ambient temperatures, for example, at high altitude. Conventional engines of this type include an anti-ice manifold which radially surrounds the inlet guide vanes 14 and provides heated gases to the interior passages 20 of the inlet guide vanes through radially outer openings on the vanes. In one known arrangement wherein the inlet guide vane section of the engine has immediately adjacent flanges toward the forward and aft ends of the peripheral housing section surrounding the guide vanes, the manifold can be formed by providing a cap which bridges the two flanges of the guide vane section and forms a manifold between the flanges which communicates with the interior passages of the vanes through the openings in the radially outer ends of the vanes. As previously noted, installation of a cap in this configuration requires extensive hand welding.

In accordance with the invention, and as illustrated in detail in FIGS. 2 to 5, the anti-ice manifold 16 of the present invention is formed as an integral, separate unit from the inlet guide vane peripheral housing and is mounted forward of the inlet guide vanes with rearwardly extending openings 18 connecting the manifold 16 to the interior passages 20 of the inlet guide vanes. Accordingly, manifold 16 is separately fabricated and joined to the peripheral housing surrounding the inlet guide vanes by a junction 22, and bolted thereto by a forward guide vane flange 24. The guide vane housing is separately connected to the rearwardly adjacent housing by rear guide vane flange 26.

In addition to functioning as an anti-ice manifold, structure 16 additionally provides an inlet extension duct/seal guide by having a tapered forward cross-section 30 that mates with inlet seal member 28 of the engine nacelle. Structure 16 is toroidal and substantially uniform in cross-section, having a cylindrical outer wall 32, a cylindrical inner wall 34 and a planar rear wall 36 in addition to the tapered forward section 30. The closed toroidal manifold is provided with heated air which is conveyed by rearwardly facing openings 18 to the interior passage 20 of inlet guide vanes 14.

The substantially uniform toroidal structure of manifold 16 makes the structure relatively easy to fabricate as a separate unit. The various walls of the unit can be separately formed as circular pieces then welded together by circular automated machine welds. Possible weld joint positions are indicated by numeral 40 in FIG. 3.

In addition to providing an anti-ice manifold, the structure 16 can be provided with an integral duct 38 for conveying the static pressure to sensors for engine control functions. Radially inward passages 42, as shown in FIG. 5, may be provided for sensing intake pressure at various circumferential points. FIG. 5 additionally shows the arrangement of the engine mounting lugs 44, which are isolated from the heated gas in manifold 16 and accordingly subject to reduced temperature stress.

Figure 4:
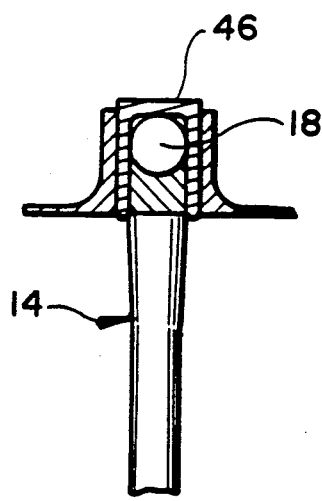
FIG. 4 is another modified cross-sectional view of the FIG. 1 engine.

FIG. 4 is a modified cross sectional view taken as shown in FIG. 2 and showing an end cap 46 on inlet guide vane 14 sealing the normally open radially outer end thereof. FIG. 4 also shows the discharge hole 18 which can be varied in size from strut to strut to better control the distribution of heated gas as required for strut heating while minimizing bleed air requirements. Guide vanes which are at circumferential locations of manifold 16 closer to the heated gas supply would have smaller passages 18 than those at other circumferential locations.

The manifold 16 according to the invention functions as anti-ice manifold, inlet static pressure duct and inlet extension duct/seal guide. It is easily formed as a separate part reducing the need for manual welding of a cap to flanges 24 and 26 to form a conventional manifold. The structure can be easily removed from the engine by flange 24 for replacement and/or servicing. The assembly 16 with its circular symmetry is fabricated from circular parts by simple circular automated machine welds.

While there has been described what is believed to be the preferred embodiment of the invention, those skilled in the art will recognize that other changes and modifications can be made thereto without departing from the spirit of the invention and it is intended to claim all such changes and modifications as fall within the true scope of the invention.

I claim:

1. An improved anti-ice manifold for use in a gas turbine engine for conducting heated gas to inlet guide vanes comprising a hollow toroidal manifold having substantially cylindrical inner and outer walls, a generally planar rear wall for mounting to said inlet guide vanes and pointed front cross-section for engaging the duct seal on an engine nacelle, said rear wall including vent openings communicating with the interior of said inlet guide vanes for conducting said heated gas thereto, wherein said vent openings have varied opening sizes around the periphery of said manifold to provide optimum distribution of said heated gas to said inlet guide vanes.

2. An improved anti-ice manifold for a gas turbine engine for conducting heated gas to inlet guide vanes comprising a hollow toroidal manifold having a rearwardly facing surface having openings formed therein for mating with a forward guide vane assembly outer flange and arranged for axial mounting to said guide vane assembly flange with said openings communicating to the hollow interior of individual guide vanes for conducting said heated gas thereto; said manifold being formed with a substantially uniform exterior cross-section and having a tapered exterior forward end for sealing engagement with a forward duct seal on an engine nacelle.

3. An improved anti-ice manifold for a gas turbine engine for conducting heated gas to inlet guide vanes, comprising a hollow toroidal manifold arranged for axial mounting to said engine forward of said inlet guide vanes of said engine, said manifold having a forward end with a tapered cross-section for being received in a forward duct seal on an engine nacelle and having rearwardly facing openings for conducting said heated gas to said inlet guide vanes, and further comprising a toroidal duct formed integrally with and isolated from said manifold and having radially inner openings for conveying engine gas pressures to said toroidal duct.

4. An anti-ice manifold as specified in claim 1 wherein said manifold is fabricated from substantially circular pieces of sheet metal and wherein said pieces are joined with circular automated machine welds.

* * * * *